US008261463B2

(12) United States Patent
Trisko

(10) Patent No.: US 8,261,463 B2
(45) Date of Patent: Sep. 11, 2012

(54) LAYOUT POSITIONING DEVICE

(75) Inventor: Bobbi Trisko, St. Cloud, MN (US)

(73) Assignee: The Antioch Company, LLC, St. Cloud, MN (US)

( * ) Notice: Subject to any disclaimer, the term of this patent is extended or adjusted under 35 U.S.C. 154(b) by 0 days.

(21) Appl. No.: 13/193,948

(22) Filed: Jul. 29, 2011

(65) Prior Publication Data

US 2012/0023767 A1 Feb. 2, 2012

Related U.S. Application Data

(60) Provisional application No. 61/369,522, filed on Jul. 30, 2010.

(51) Int. Cl.
*G01B 1/00* (2006.01)

(52) U.S. Cl. ............................... 33/645; 33/562; 33/613

(58) Field of Classification Search .................... 33/645, 33/613, 562

See application file for complete search history.

(56) References Cited

U.S. PATENT DOCUMENTS

| | | | | |
|---|---|---|---|---|
| 4,365,454 | A * | 12/1982 | Davis | 52/578 |
| 4,793,725 | A * | 12/1988 | Cheng | 403/174 |
| 5,121,526 | A * | 6/1992 | Burkard et al. | 24/336 |
| 5,494,178 | A * | 2/1996 | Maharg | 52/509 |
| 5,775,036 | A * | 7/1998 | Stanley, Sr. | 52/127.2 |
| D404,942 | S * | 2/1999 | Laib | D6/510 |
| 6,669,036 | B1 * | 12/2003 | Yang et al. | 211/181.1 |
| 6,718,709 | B2 * | 4/2004 | Sarkisyan et al. | 52/285.1 |
| 7,143,522 | B2 * | 12/2006 | Brueckert et al. | 33/542 |
| 7,207,144 | B2 * | 4/2007 | Shepard | 33/645 |
| 7,908,718 | B2 * | 3/2011 | Glasser | 24/336 |
| 2002/0121027 | A1 * | 9/2002 | Kruskamp | 33/526 |
| 2005/0246914 | A1 * | 11/2005 | Perea | 33/562 |
| 2012/0023767 | A1 * | 2/2012 | Trisko | 33/645 |

* cited by examiner

*Primary Examiner* — Yaritza Guadalupe-McCall

(74) *Attorney, Agent, or Firm* — Dicke, Billig & Czaja, PLLC; Peter Forrest

(57) ABSTRACT

A device for positioning photographs and the like with respect to each other so that they may be moved as a group as they are repositioned over (or removed entirely from) a workpiece such as a scrapbooking page. In alternative embodiments, the device also serves as a platform for other scrapbooking tools (cutting blades, pens, etc.) that can be applied to one or more of the photographs.

14 Claims, 10 Drawing Sheets

LAYOUT POSITIONING DEVICE

BACKGROUND

Creation of framed artwork generally requires one to determine the dimensions and desired orientation of the artwork, along with the dimensions and locations of any matting and the dimensions of the desired frame. Particularly for situations involving complex matting schemes, the process involves several measurements and calculations that must be properly added together to result in the amount of framing material required. When the process is performed repeatedly to estimate of the varying costs of several different framing options, the potential for error is evident.

SUMMARY

This application discloses a device for positioning photographs with respect to each other so that as a group they may be spaced, moved, cropped (if desired) and positioned onto a workpiece (typically a scrapbooking page). The term "photographs" includes similar flat materials such as matted photographs, papers, etc.

BRIEF DESCRIPTION OF THE DRAWINGS

The figures illustrate a preferred embodiment and thus it should be understood that minor changes in shape, proportion, size, and the like are not critical to the scope of the disclosure except as specifically noted elsewhere in this application.

DETAILED DESCRIPTION

In general terms, this application pertains to a discloses a device for positioning photographs with respect to each other so that as a group they may be spaced, moved, cropped (if desired) and positioned onto a workpiece (such as a scrapbooking page). The term "photographs" includes similar flat materials such as matted photographs, papers, etc.

The basic operation of the device is to clamp two, three, or four photographs, by their edges or corners, into position relative to each other so that they may be handled together, e.g., by cropping outer regions of the set of photographs away with a cutting template and cutting tool. This ensures that the layout of the group of photographs is attractive and may be maintained as the group is moved to the scrapbook page for further work (e.g., attachment to the page). Thus, the device implements a method for positioning photographs and the like with respect to each other so that as a group they may be spaced, moved, cropped (if desired) and positioned onto a workpiece such as a scrapbooking page.

A preferred, but not required, embodiment is illustrated in FIGS. 1-8 as layout positioning device (or simply "device") 100. The details of construction of device 100 are illustrated in FIGS. 2-8, which illustrate various components assembled together to form device 100. In general terms, device 100 is assembled by attaching clamp 200 with knob 300 to base assembly 400.

Figure 1:
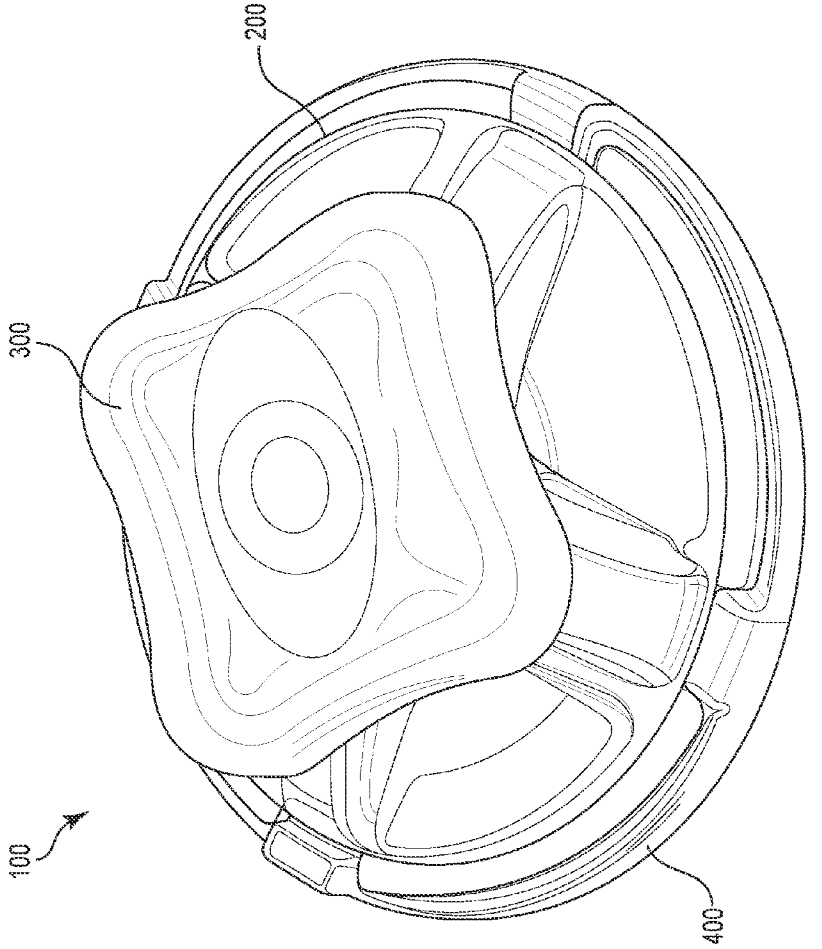
FIG. 1 is a perspective view of a preferred embodiment.
Figure 2:
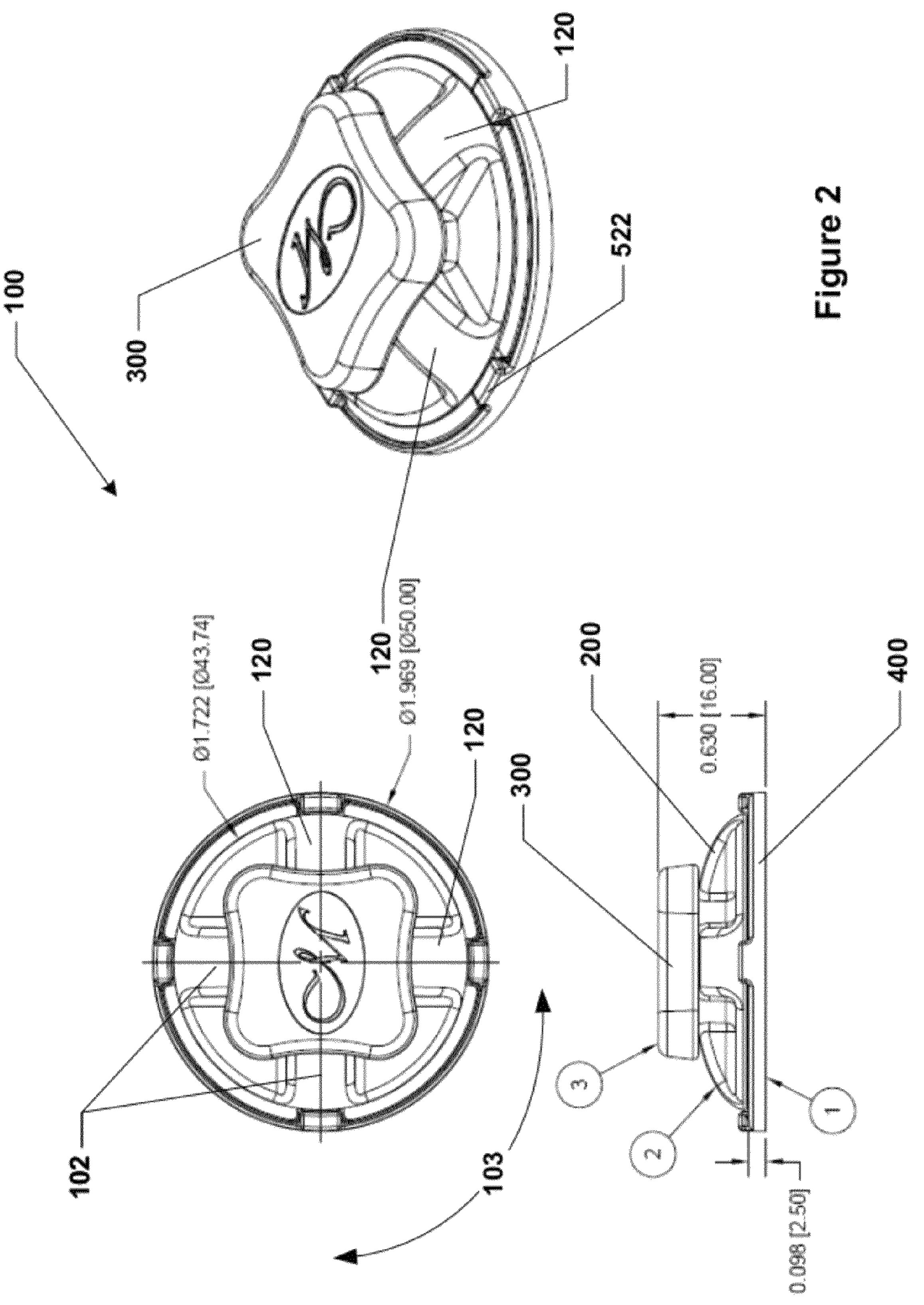
FIGS. 2-8 are each multiple-angle views of individual components of the preferred embodiment of FIG. 1.

As shown in FIGS. 1 and 2, device 100 has a generally circular base assembly 400, which comprises a generally flat lower side facing the work piece and an upper side facing the remainder of the device. The upper side comprises at least one and preferably two (as in the preferred embodiment illustrated) intersecting central spines 120 that define two perpendicular axes 101, 102. These form (as illustrated, four) spaces 103 around the perimeter of device 100, each of which accepts an edge or (in the preferred embodiment) a corner of a rectangular photograph or other artwork 30 (see FIG. 9). In other, less preferred embodiments, there could be a single central spine (and thus two spaces, one on each side of the single spine), or a Y-shaped central spine (and thus three spaces).

Figure 3:
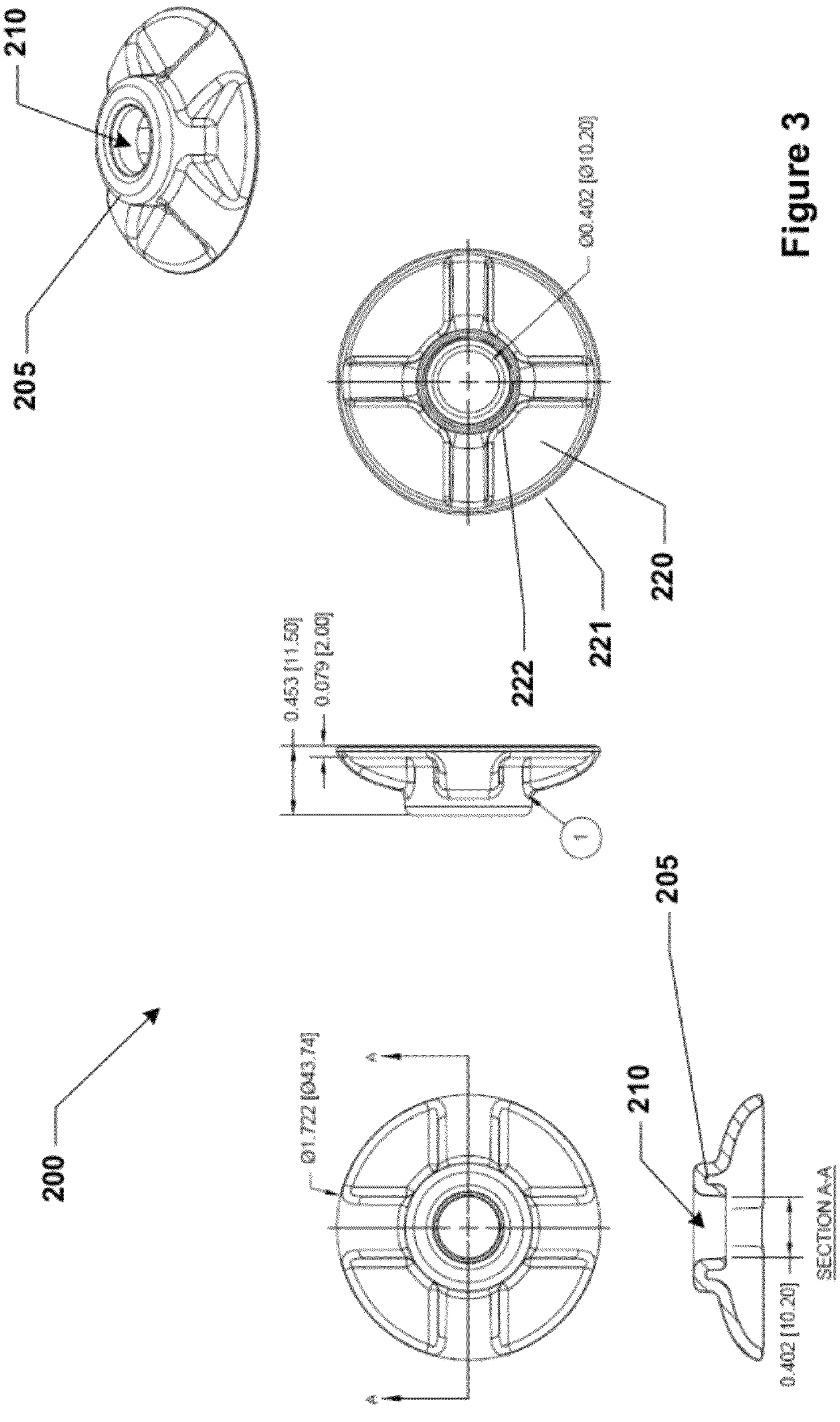

Turning specifically to FIG. 3, clamp 200 is shaped and sized to fit over the upper face of base 100 and thus the lower face of clamp 200 comprises recessed features which generally mate with corresponding features of the central spines of base 100 (including the spaces 103 between the central spines) and vice versa. This provides smooth flat surfaces 220 on the lower side of clamp 200 corresponding in size, shape, and location to spaces 103. Clamp 200 preferably includes ridge 221 along its lower outer perimeter. Ridge 221 mates with corresponding features in the base as described further below. Clamp 200 further comprises a central hub 205 defining central hole 210 through which knob 300 passes to connect to base 100.

Figure 4:
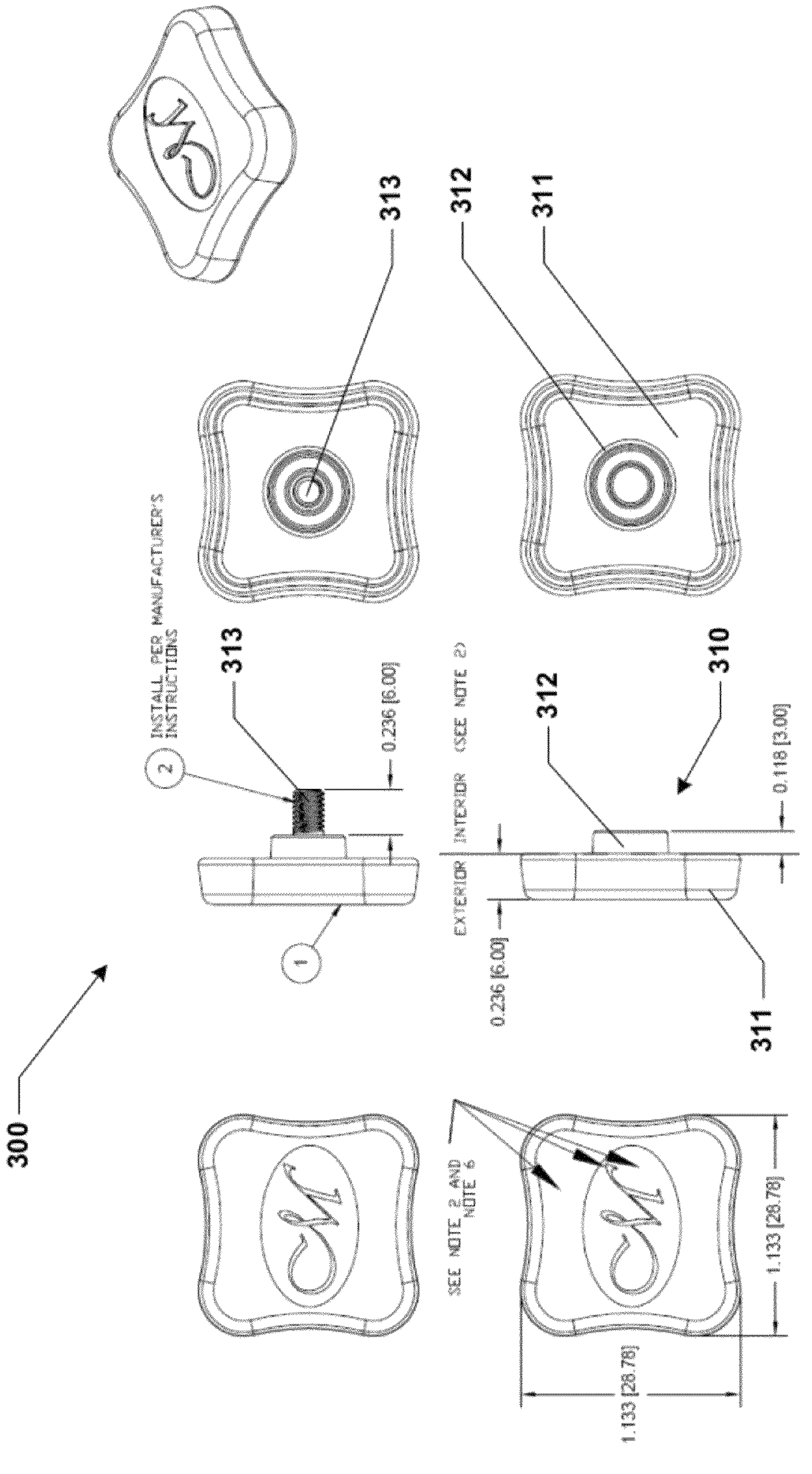

Turning next to FIG. 4, knob 300 comprises a handle 310 having exterior and interior portions 311, 312 respectively, and a threaded stud 313. Interior portion 312 supports threaded stud 313 and is sized and shaped to fit snugly into (but still able to rotate within) both central recess 210 of clamp 200 and central recess 410 of base 400. This reduces wobble or play when device 100 is assembled and clamped, and thus helps hold the photographs in position.

Figure 5:
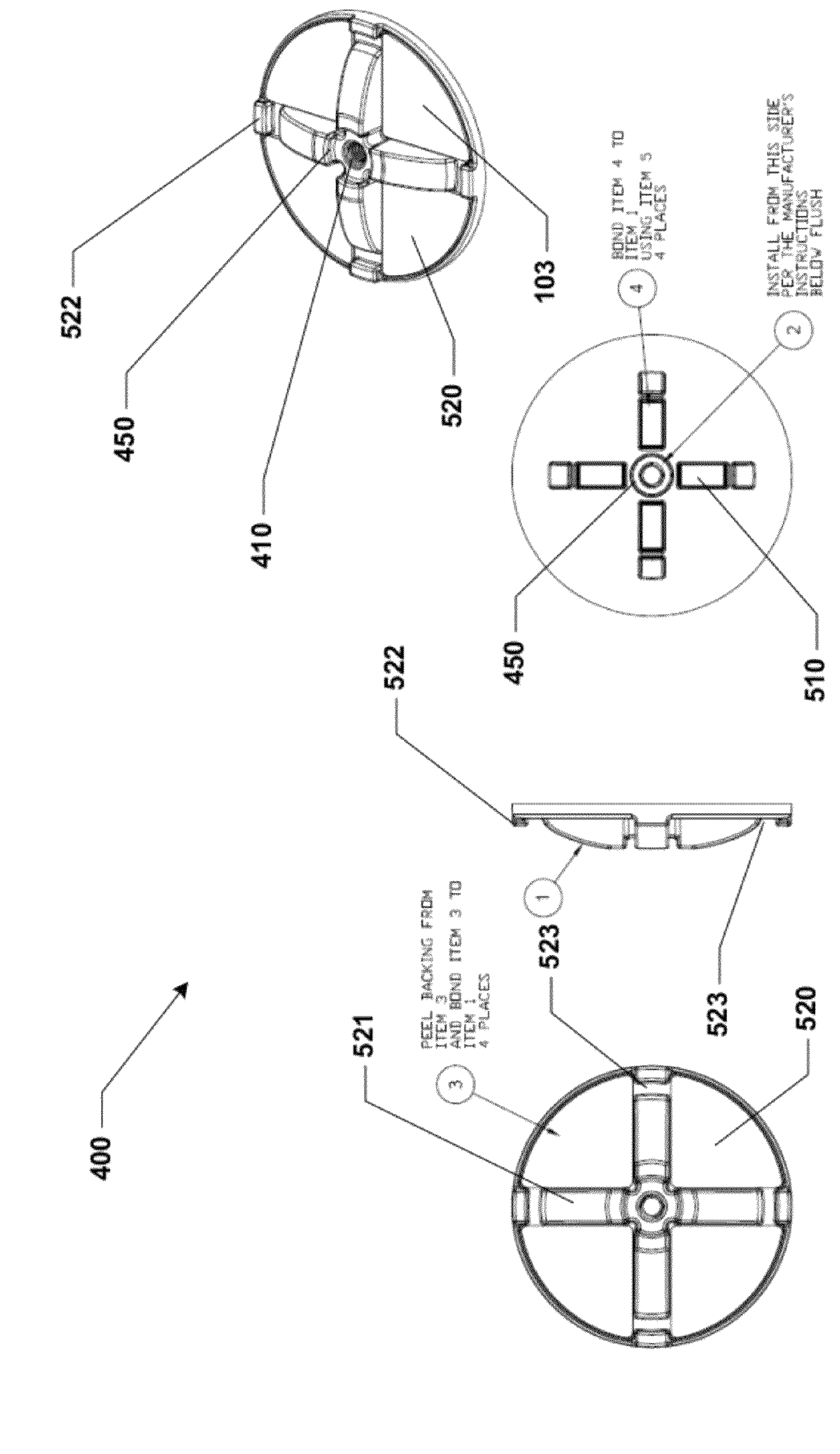
Figure 6:
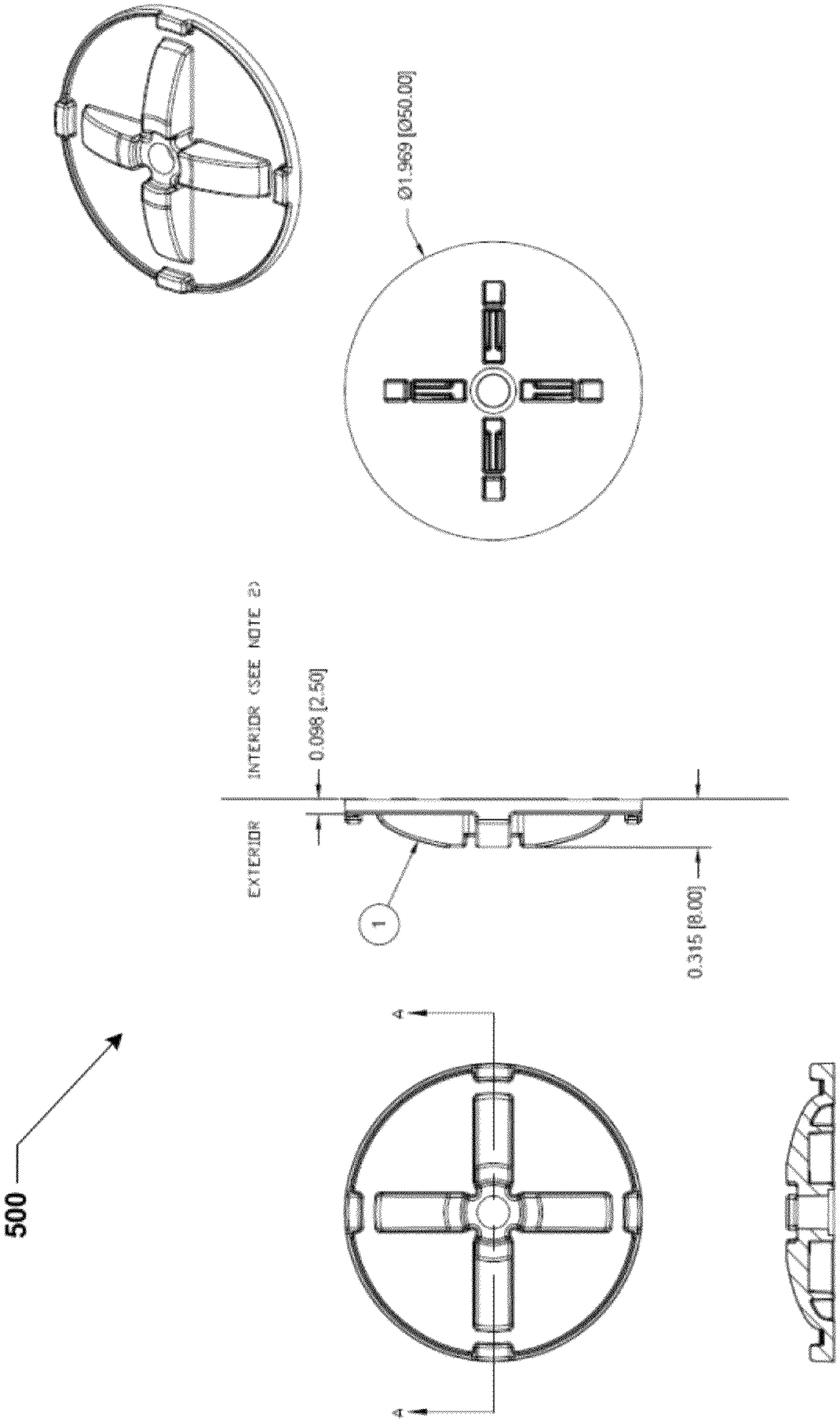
Figure 7:
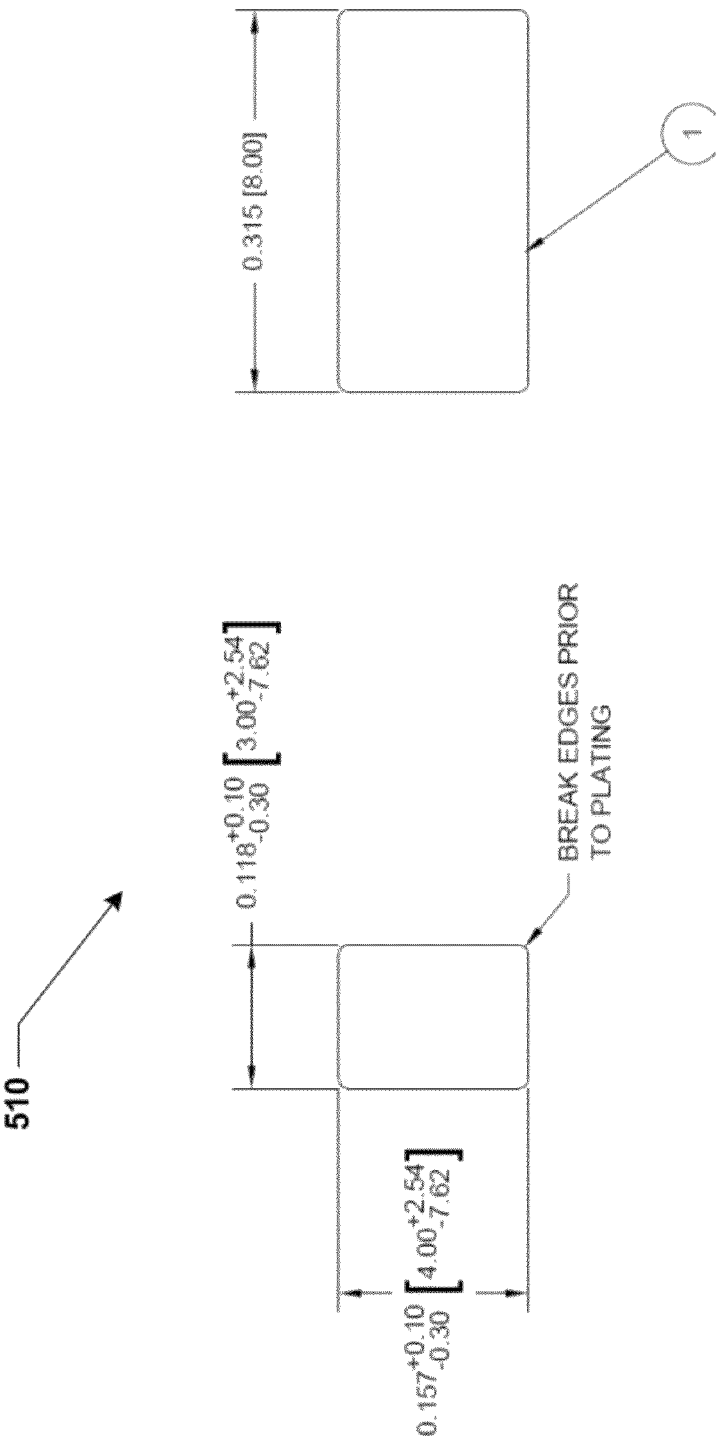
Figure 8:
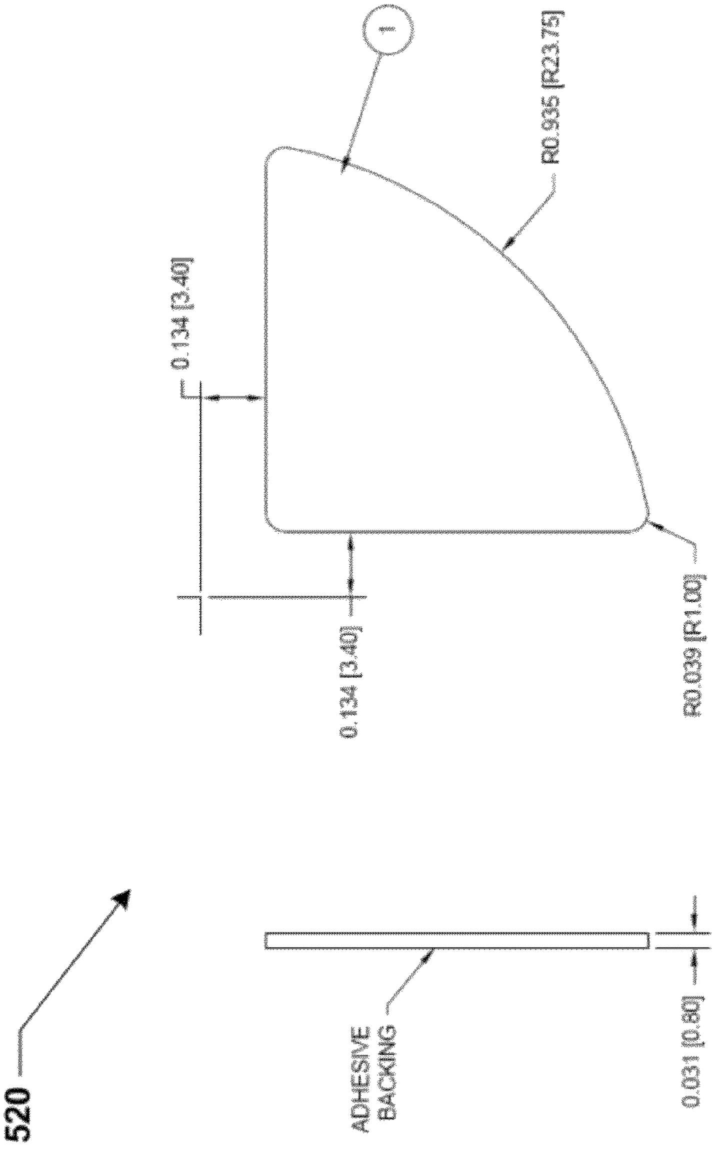

Turning now to FIG. 5, base assembly 400 comprises base 500 (see also FIG. 6), threaded insert 450 installed into a central recess 410 of base 500, and (if present) optional pads 520 (see also FIG. 8). Threaded insert 450 is preferably installed with an adhesive, although a snap fit or other means for attachment is possible. In principle, a separate threaded insert is not required if the threads are provided in base 500 itself, but this is not preferred. In either case, threaded stud 313 of knob 300 mates with the threads, i.e., with threaded insert 450 as illustrated here. In the preferred embodiment, threaded stud 313 is externally (male) threaded and threaded insert 450 is internally (female) threaded, but this could be reversed by having an externally threaded stud extend from base 500 and an internally threaded insert placed within interior portion 312 of knob 300. Other, non-threaded, means for removably attaching knob 300 (and thus clamp 200) to base assembly 450 could be employed.

The portions of central spines 120 formed in base 500 preferably each comprise a main (radially inward) portion 521 and a secondary (radially outward) portion 522, separated from each other by gap 523. Gap 523 accommodates the outer perimeter and ridge 221 of clamp 200 described above. When knob 300 is used to hold clamp 200 against base 500, the circumference of clamp 200 aligns with each gap 523 and thus the entire flat portion of the upper face of base 500, which holds each photograph more securely. Additional ridges 222 (see FIG. 3) around the periphery of each flat surface 220 may also be provided for the same purpose. The potential for such ridges to deform the photograph is reduced by the use of a optional backing pad as described below.

At least one magnet 510 (see also FIG. 7) is provided in base assembly 400. In the preferred embodiment, the lower surface of base 500 is formed with one or more indentations or other locations into which a corresponding number of magnets 510 are installed (preferably by an adhesive, although a snap fit or other means for attachment could used). The preferred placement of each indentation or other location is directly beneath a central spine 120, but this is not required.

In other embodiments (not illustrated), indentations are not required at all because a sheet of magnetic material is installed (typically adhered) flush to some or all of the lower face of base 400.

The magnet(s) enable device 100 to be magnetically attached to a surface and thus device 100 may serve as a magnetic photo holder, e.g., it and the photographs clamped within it may be attached to a refrigerator or a dedicated mounting plate such as the Everyday Display fabric-covered magnetic board available from Creative Memories (www.creativememories.com).

Note, however, that the photographs are not held between the magnet and the metallic surface. Instead, the photographs are clamped within device 100 and then device 100 is magnetically attached to the surface. Removing device 100 does not allow the photographs to fall to the floor, but instead they remain clamped within device 100 and thus are removed as a unit with device 100.

Turning to FIG. 8, as noted before, at least one pad 520 may be provided on the upper surface of base assembly 400. In the preferred embodiment, base 500 is formed with a series of pads 520 corresponding in number, shape and size to spaces 103. Pads 520 are preferably attached to base 500 by an adhesive, although a snap fit or other means for attachment could used. Pads 520 reduce slippage and protect the surfaces of the photographs or other artwork inserted into spaces 103. It is also possible, but not required, to use similar pads on the lower surfaces 220 of clamp 200, i.e., located between ridges 221 and 222 (see FIG. 3).

Regardless of whether magnets 510 or pads 520 are used, a cutting template may be positioned around the outer (non-clamped) edges of the assembly of pieces of artwork clamped to each other, so that the entire collection may be trimmed in a coordinated pattern to form a new piece of artwork.

Figure 9:
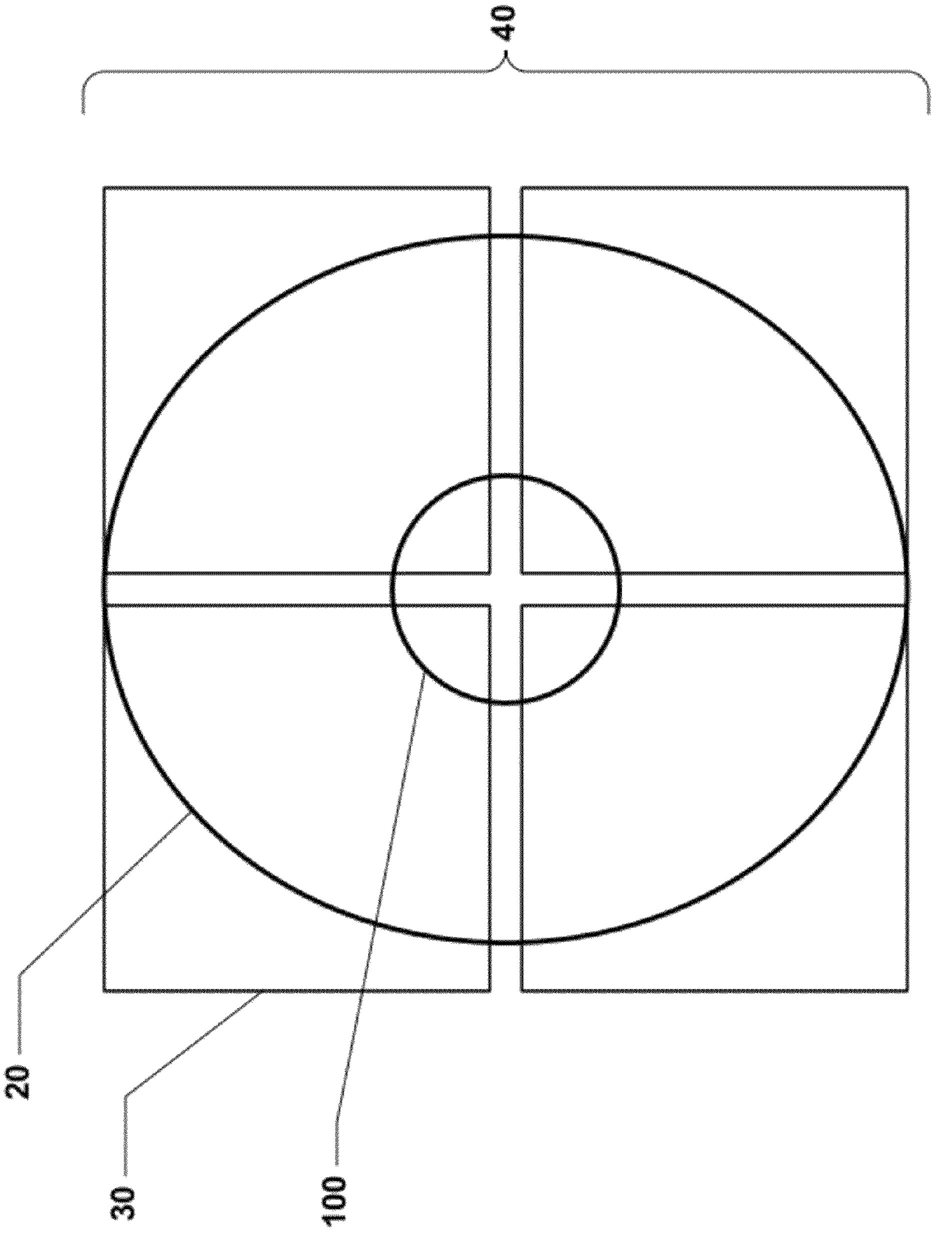
FIG. 9 is a schematic illustration of the use of the preferred embodiment of FIGS. 1-8.

For example, as schematically illustrated in FIG. 9, a large circular or oval template 20 could be used to trim a coordinated collection of individual rectangular photographs 30 (typical of four shown) held by device 100 to form a collage 40. (A collage is "a work of formal art, primarily in the visual arts, made from an assemblage of different forms, thus creating a new whole" according to the Wikipedia entry at http://en.wikipedia.org/wiki/Collage [accessed Jul. 30, 2010]).

While the width of each central spine 120 is generally not critical, it is desirable to provide each spine with an appreciable width on the order of 2-5 millimeter so that the entire arrangement of the photographs is well balanced and attractive, as illustrated in FIG. 9. The clamping nature of device 100 helps ensure that the spacing between adjacent edges of different photographs remains constant.

Specifically, the following steps may be followed to use device 100. The knob is loosened slightly by turning the handle counter-clockwise. Up to four items (in the preferred embodiment) are inserted into corresponding spaces. The items are secured in place by turning the knob clockwise to tighten the grip. The items may be displayed as-is, or cropped or mounted as described in the next steps. For cropping, the device (with items securely gripped) is placed on a cutting mat. A cutting template is positioned around the items. The portions outside the perimeter of the template are cut with a selected blade. (It is desirable to cut slowly from item to item to ensure a smooth cut.) For mounting, a position on the workpiece (scrapbook page, paper or other project surface) where the items will be mounted or adhered is identified. Adhesive or adhesive tape is applied to the back of each outer corner or edge. All corners or edges are firmly pressed to the layout or project. The grip of the device is released the grip by turning the handle counterclockwise. The device is pulled straight up to remove it. Adhesive is applied to the remaining edges and corners.

Figure 10:
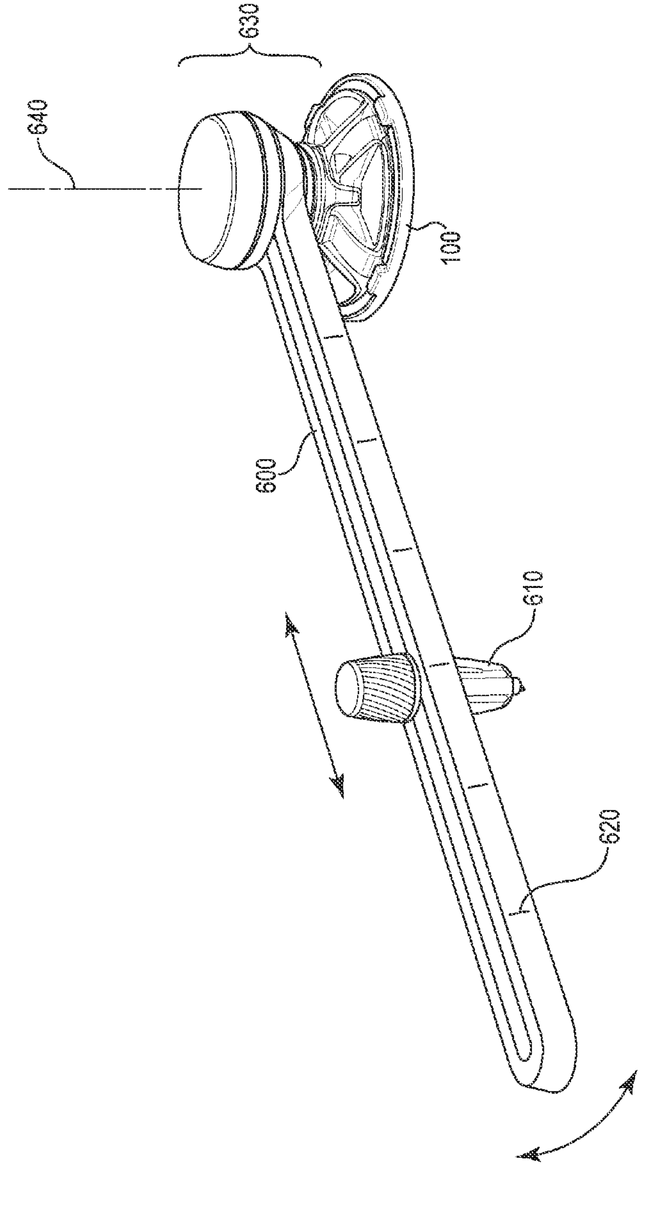
FIG. 10 is a perspective view of an alternative embodiment.

An optional alternative embodiment is illustrated in FIG. 10. In this embodiment, device 100 is further includes an auxiliary arm 600 which in turn supports a tool 610. Arm 600 is preferably provided with measurement indicia 620 to aid in the location of tool 610 in the radial direction away from the central axis 640 of device 100. A supplemental mounting mechanism 630 is provided to couple auxiliary arm 600 to device 100, e.g., by replacing the knob 300. Mounting mechanism 630 thus also may have a threaded shaft (not illustrated) to perform the function of threaded stud 313 described above.

Mounting mechanism 630 enables rotation of arm 600 around the central axis 640, as indicated by the curved two-headed directional arrow, while the photograph(s) remain clamped in device 100 which it itself stationary. This enables tool 610 to cut or mark or otherwise treat the photographs (not shown) that are clamped into device 100. For example, a cutting tool would allow the collection of photographs (as a whole) to be cut individually yet form a circular pattern when placed together on the workpiece. Or, using a marking tool, the collection could be simply marked for separate cutting by hand after they are removed from device 100.

As illustrated, auxiliary arm 600 is a double-railed configuration reminiscent of a tuning fork, but this is only a preference. Similarly, while tool 610 is depicted as continuously adjustable in the radial direction (i.e., by loosening/tightening its upper and lower portions against arm 600 and sliding it radially in either direction), it is possible to provide arm 600 with detents or other features at discrete locations.

Preferred materials and manufacturing techniques for the components include the use of commercial grade plastics meeting industry standard tolerances and workmanship. Preferred materials include thermoplastics such as acrylonitrile butadiene styrene (ABS), (e.g., ABS 758). It is preferred that clamp 200 be transparent to allow for more accurate positioning of the photographs in each space 103. Similarly, it is preferred that base 400 be an opaque color such as dark blue. A typical pair of threaded insert and stud would be M4.0×0.7, 6 mm long and chrome plated in the case of the stud and 4.7 mm long and flanged in the case of the insert. Commercial grade neodyminum alloy magnets (e.g., those based on a $Nd_2Fe_{14}B$ alloy) having a nickel plated finish are suitable. The optional pad may be a commercial grade silicone sheet having durometer of 30 (Shore A scale) with commercially available adhesives compatible with the other materials employed.

I claim:

1. A device for positioning at least two photographs with respect to each other so that they may be moved as a group, comprising: a base and a clamp mating to the base along a central axis of the device, each of the base and the clamp comprising one of two mating sides of at least one central spine, thereby forming a plurality of spaces around a perimeter of the device into which a corner portion of each of the photographs may be held, a knob that causes the base and clamp to engage each other to hold the photographs, and an arm, mounted to the device such that the arm revolves around a central axis of the device, the arm being long enough to extend radially beyond the perimeter of the device, in which the arm supports a tool directed toward at least one of the photographs.

2. The device of claim 1, in which there are four spaces for photographs.

3. The device of claim 1, in which the device further comprises at least one magnet.

4. The device of claim 1, in which the device further comprises at least one pad.

5. A device for positioning at least two photographs with respect to each other so that they may be moved as a group, comprising: a base and a clamp mating to the base along a central axis of the device, each of the base and the clamp comprising one of two mating sides of at least one central spine, thereby forming a plurality of spaces around a perimeter of the device into which a corner portion of each of the photographs may be held; and a knob that causes the base and clamp to engage each other to hold the photographs; in which the clamp has an outer perimeter comprising a ridge, and each central spine of the base comprises an inward portion and an outward portion separated from each other by a gap into which the ridge extends.

6. The device of claim 5, in which there are four spaces for photographs.

7. The device of claim 5, in which the device further comprises at least one magnet.

8. The device of claim 5, in which the device further comprises at least one pad.

9. The device of claim 5, further comprising an arm, mounted to the device such that the arm revolves around a central axis of the device, the arm being long enough to extend radially beyond the perimeter of the device, in which the arm supports a tool directed toward at least one of the photographs.

10. A device for positioning at least two photographs with respect to each other so that they may be moved as a group, comprising: a base and a clamp mating to the base along a central axis of the device, each of the base and the clamp comprising one of two mating sides of at least one central spine, thereby forming a plurality of spaces around a perimeter of the device into which a corner portion of each of the photographs may be held; a knob that causes the base and clamp to engage each other to hold the photographs; in which each central spine comprises a vertically upward extension of the base mating with a vertically recessed feature of the clamp.

11. The device of claim 10, in which there are four spaces for photographs.

12. The device of claim 10, in which the device further comprises at least one magnet.

13. The device of claim 10, in which the device further comprises at least one pad.

14. The device of claim 10, further comprising an arm, mounted to the device such that the arm revolves around a central axis of the device, the arm being long enough to extend radially beyond the perimeter of the device, in which the arm supports a tool directed toward at least one of the photographs.

* * * * *